United States Patent [19]

Staker et al.

[11] Patent Number: 4,560,497

[45] Date of Patent: Dec. 24, 1985

[54] AMINO ESTER AND AMINO AMIDE-ESTER CORROSION INHIBITORS FOR AQUEOUS SYSTEMS

[75] Inventors: Donald D. Staker; William S. Kain, both of Cincinnati, Ohio

[73] Assignee: National Distillers and Chemical Corporation, New York, N.Y.

[21] Appl. No.: 612,238

[22] Filed: May 21, 1984

[51] Int. Cl.$^4$ .............................................. C23F 11/00
[52] U.S. Cl. ...................................... 252/392; 422/16
[58] Field of Search .................. 252/180, 392; 422/16

[56] References Cited

U.S. PATENT DOCUMENTS

| | | | |
|---|---|---|---|
| 2,902,499 | 9/1959 | Gottshall et al. | 252/51.5 A |
| 2,975,133 | 3/1961 | Gottshall et al. | 252/392 |
| 3,985,504 | 10/1976 | Kindscher et al. | 252/392 |
| 4,156,040 | 5/1979 | Swider et al. | 427/226 |
| 4,317,740 | 3/1982 | Eisenhard | 252/56 D |

*Primary Examiner*—Paul Lieberman
*Assistant Examiner*—Willie J. Thompson
*Attorney, Agent, or Firm*—Kenneth D. Tremain; Gerald A. Baracka

[57] ABSTRACT

Corrosion inhibiting amino ester and amino amide-ester compositions which are readily soluble or dispersible in water are provided. The anti-corrosive agents of this invention are obtained by reacting a maleinized polymeric fatty acid, a poly(oxyalkylene) glycol or alkoxypoly(oxyalkylene) glycol and nitrogen-containing compound so that at least 50 percent of the total available carboxyl functionality of the maleinized polymeric fatty acid is reacted.

11 Claims, No Drawings

AMINO ESTER AND AMINO AMIDE-ESTER CORROSION INHIBITORS FOR AQUEOUS SYSTEMS

BACKGROUND OF THE INVENTION

Field of the Invention

This invention relates to anti-corrosion agents which are useful for the protection of metal surfaces which come into contact with water-containing hydrocarbons, such as oil/water mixtures obtained during oil-producing operations. More particularly, the invention relates to amino ester and amino amide-ester corrosion inhibitors which are the reaction product of a maleinized polymeric fatty acid, a poly(oxyalkylene)glycol and a nitrogen-containing compound.

Prior Art

Corrosion of metal tubing, casings, pumps and other collection equipment employed in oil-producing operations by petroleum products which contain water is known. Corrosion is particularly pronounced when a substantial quantity of brine containing acidic materials, such as hydrogen sulfide, carbon dioxide and the like, is present in the hydrocarbon oil. In order to protect metal surfaces, it is therefore common practice to add corrosion inhibitors to the petroleum fluid.

The problem has become even more pronounced to recent years due to the increased use of secondary recovery methods which utilize various forms of water flooding. As a result, there is an increasing need for water-soluble corrosion inhibitors. In view of this increased usage and the continual development of new applications where such products are utilized, there is an everincreasing need for new water-soluble corrosion inhibitor products which are effective at low concentrations and are readily obtainable using available processes and reactants.

U.S. Pat. No. 3,985,504 discloses water-soluble anti-corrosive agents which are saponified ene-adducts of maleic anhydride to an unsaturated fatty acid having from 12 to 24 carbon atoms and containing at least one olefinic double bond or derivatives thereof, such as amides or esters. The ene-adducts are saponified with sodium hydroxide, potassium hydroxide, trimethylamine, triethylamine, triisopropylamine, triisobutylamine, triethanolamine or triisopropanolamine to obtain the anti-corrosive agents which are useful in water-containing or aqueous liquids coming into contact with iron or metals containing iron.

U.S. Pat. No. 4,317,740 discloses water-soluble polyesters obtained by condensing a polyoxyalkylene glycol with the addition product of a dimer fatty acid and maleic anhydride. The polyester compositions of U.S. Pat. No. 4,317,740 are employed in aqueous hydraulic systems and exhibit a substantial thickening effect.

Adducts of dimer acid and maleic acid/anhydride are reacted with aliphatic monoamines containing 8 to 22 carbon atoms per molecule and/or esters of monohydric alcohols containing 8 to 22 carbon atoms in U.S. Pat. Nos. 2,902,499 and 2,975,133, however, the resulting corrosion inhibitors are oil-soluble compositions.

SUMMARY OF THE INVENTION

The present invention relates to amino ester and amino amide-ester corrosion inhibitors and their use for the protection of metal surfaces which are contacted with water-containing hydrocarbons. The products of this invention are particularly effective corrosion inhibitors when added to oil-water mixtures obtained in oil-producing operations. The corrosion inhibitors are readily soluble or dispersible in water and are obtained by the reaction of a maleinized polymeric fatty acid with a poly(oxyalkylene)glycol and a nitrogen-containing compound.

Poly(oxyalkylene)glycols used to obtain the corrosion inhibitors have average molecular weights from about 200 to 8000. Polyethylene glycols having average molecular weights from about 300 to 4000 and methoxypolyethylene glycols having an average molecular weight 300 to 1000 are particularly useful. Nitrogen-containing compounds which are employed to obtain the amino ester or amino ester-amide products include compounds corresponding to the formulae

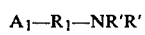

$$A_1-R_1-NR'R'$$

wherein $R_1$ is a bivalent hydrocarbon radical having from 2 to 6 carbon atoms, $R'$ is hydrogen or a $C_{1-4}$ alkyl group, and $A_1$ is —OH, —NH$_2$ or —NHR' wherein R' is the same as defined above;

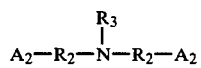

$$A_2-R_2-\underset{\underset{R_3}{|}}{N}-R_2-A_2$$

wherein $R_2$ is a bivalent hydrocarbon radical having from 2 to 4 carbon atoms, $R_3$ is hydrogen, $C_{1-4}$ alkyl, —R$_2$OH or —R$_2$NH$_2$ wherein $R_2$ is the same as defined above and $A_2$ is —OH or —NH$_2$; or

$$A_3\text{-}(R_4O)_xR_4NH_2$$

wherein $R_4$ is —CH$_2$CH$_2$—, —CH$_2$CH$_2$CH$_2$— or

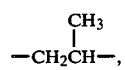

$$-CH_2CH-\underset{\underset{CH_3}{|}}{}$$

x is an integer from 1 up to about 40 and $A_3$ is —OH, —NH$_2$ or an alkoxy radical having from 1 to 12 carbon atoms.

The poly(oxyalkylene)glycol, nitrogen-containing compound and maleinized polymeric fatty acid can be reacted as a unit operation or, as is more generally the case, the maleinized polymeric fatty acid and poly(oxyalkylene)glycol may be first reacted and the resulting partial ester then reacted with the nitrogen-containing compound. At least 50 percent, and in many instances 80 percent or more, of the total available carboxyl groups of the maleinized polymeric fatty acid are reacted with the poly(oxyalkylene)glycol and nitrogen-containing compound.

DETAILED DESCRIPTION

The corrosion inhibitors of the present invention are obtained by reacting a maleinized polymeric fatty acid with a poly(oxyalkylene)glycol and nitrogen-containing compound. The resulting amino ester and amino amide-ester products are readily soluble or dispersible in water and are effective corrosion inhibitors for oil-water mixtures obtained from oil-producing operations.

Maleinized polymeric fatty acids are known and are obtained using conventional condensation procedures which are described in the literature, such as U.S. Pat. Nos. 2,902,499 and 2,975,133. In general, the procedure involves heating maleic acid/anhydride and a polymeric (primarily dimer) fatty acid at a temperature from 100° C. to 300° C. until condensation has been effected. The molar ratio of the maleic acid/anhydride to polymeric fatty acid generally ranges from about 1.0:1.0 to 0.4:1.0. Conventional polymeric fatty acids are employed for the reaction with the maleic acid or maleic anhydride to obtain the maleinized addition product. It is particularly advantageous if the polymeric fatty acids are derived from $C_{18}$ unsaturated monocarboxylic acids, such as oleic acid, linoleic acid, linolenic acid, or mixed unsaturated monocarboxylic acids comprised predominantly of $C_{18}$ acids, such as tall oil fatty acid, and if the polymeric fatty acids are comprised primarily of $C_{36}$ dimer acid. Maleinized polymeric fatty acids derived from polymeric fatty acids containing 75 percent or more $C_{36}$ dimer acid are particularly advantageous for the preparation of the corrosion inhibitors of the present invention.

To obtain the corrosion inhibitors of this invention, the maleinized polymeric fatty acid is reacted with a poly(oxyalkylene)glycol and a nitrogen-containing compound. This is most generally accomplished in a step-wise manner—by first reacting the maleinized fatty acid with the poly(oxyalkylene)glycol to form a partial ester and, when this reaction is essentially complete, charging the nitrogen-containing compound and continuing the reaction. Substantially all or a portion of the available carboxyl groups of the partial ester may be reacted with the nitrogen-containing compound. Depending on the particular reactants and conditions employed, it is also possible to react the poly(oxyalkylene)glycol, nitrogen-containing compound and maleinized polymeric fatty acid in a unit operation.

Poly(oxyalkylene)glycols reacted with the maleinized polymeric fatty acid have average molecular weights in the range 200 to 8000 and are comprised of recurring oxyalkylene groups containing 2 or 3 carbon atoms. While polyethylene glycol is particularly useful for preparation of the corrosion inhibitors of this invention, polypropylene glycols and poly(ethylene-propylene)glycols within the above molecular weight range can also be employed. It is possible to utilize poly(oxyalkylene)glycols containing higher or lower molecular weight materials and poly(oxyalkylene)glycols having a broad molecular weight distribution are generally not detrimental, so long as the average molecular weight of the poly(oxyalkylene)glycol is within the specified range. Alkoxypoly(oxyalkylene)glycols, i.e., wherein one of the terminal hydroxyl groups is "capped" with a $C_{1-4}$ alkyl group, may also be employed. The alkoxypoly(oxyalkylene)glycols have average molecular weights from 200 to 2000 and are most generally "capped" with a methyl group. Particularly advantageous corrosion inhibitors are obtained with polyethylene glycols having average molecular weights from about 300 to 4000 or methoxypolyethylene glycol having an average molecular weight from 300 to 1000.

Nitrogen-containing compounds employed for the preparation of the corrosion inhibitors contain an amine and/or hydroxyl group which can react with the carboxyl functionality of the maleinized polymeric fatty acid. Suitable nitrogen-containing compounds are selected from the group $$A_1-R_1-NR'R' \qquad (I)$$

wherein $R_1$ is a bivalent hydrocarbon radical having from 2 to 6 carbon atoms, $R'$ is hydrogen or a $C_{1-4}$ alkyl group, and $A_1$ is —OH, —NH$_2$ or —NHR' wherein R' is the same as defined above;

$$A_2-R_2-\underset{\underset{R_3}{|}}{N}-R_2-A_2 \qquad (II)$$

wherein $R_2$ is a bivalent hydrocarbon radical having from 2 to 4 carbon atoms, $R_3$ is hydrogen, $C_{1-4}$ alkyl, —R$_2$OH or —R$_2$NH$_2$ wherein $R_2$ is the same as defined above and $A_2$ is —OH or —NH$_2$; and $$A_3-(R_4O)_{\overline{x}}R_4NH_2 \qquad (III)$$

wherein $R_4$ is —CH$_2$CH$_2$—, —CH$_2$CH$_2$CH$_2$— or $$-CH_2\underset{\underset{CH_3}{|}}{CH}-,$$

x is an integer from 1 up to about 40 and $A_3$ is —OH, —NH$_2$ or an alkoxy radical having from 1 to 12 carbon atoms.

Useful nitrogen-containing compounds of Type I include ethylene diamine, N—C$_{1-6}$ alkyl propylene diamine, ethanolamine, 1,3-diaminopropane, 1,2-diaminopropane, N,N-dimethylethanolamine, N,N-diethylethanolamine, N,N-diisopropylethanolamine, N,N-dimethyl 1,3-diaminopropane, N,N-diethyl 1,3-diaminopropane, and the like. Compounds corresponding to Formula II include but are not limited to diethanolamine, triethanolamine, N-methyl diethanolamine, N-ethyl diethanolamine, aminoethylethanolamine, iminobispropylamine, diethylene triamine, triethylene tetramine and tetraethylene pentamine. Type III compounds which can be employed to obtain the present corrosion inhibitors primarily include polyglycoldiamines, such as those manufactured by Union Carbide Co., and polyoxypropyleneamines manufactured by Texaco Chemical Co. and identified as Jeffamine ® products. These latter products are difunctional primary amines and correspond to the structure $$H_2NCH(CH_3)CH_2[OCH_2CH(CH_3)]_xNH_2$$

where x ranges from about 2 to 35.

Particularly useful corrosion inhibitor compositions are obtained when the nitrogen-containing compound reacted with the maleinized polymeric fatty acid and poly(oxyalkylene)glycol is N-methyl diethanolamine, aminoethylethanolamine, N,N-dimethylethanolamine, 1,3-diaminopropane or N,N-dimethyl 1,3-diaminopropane.

For each molar equivalent of the maleinized polymeric fatty acid, 0.25 to 0.75 mole poly(oxyalkylene)glycol is reacted. Accordingly, from about 25 to about 75 percent of the carboxyl functionality of the maleinized polymeric fatty acid can be esterified with poly(oxyalkylene)glycol. An amount of nitrogen-containing compound is employed so that for each molar equivalent maleinized polymeric fatty acid a total of one mole poly(oxyalkylene)glycol and nitrogen-containing compound is utilized. For each molar equivalent maleinized polymeric fatty acid the number of moles of nitrogen-containing compound is therefore 1-[number of moles of poly(oxyalkylene)glycol]. Substantially all of the nitrogen-containing compound may be reacted or it is possible to react only a portion of the nitrogen-containing compound, provided that at least 50 percent of the total available carboxyl groups of the maleinized polymeric fatty acid are reacted.

To illustrate the reaction sequence, the general equations set forth below are provided to depict the reaction of 2 moles methoxypolyethylene glycol with 1 mole maleinized polymeric fatty acid (1:1 adduct of dimer acid and maleic acid) and reaction of the resulting partial ester product with 2 moles N,N-dimethyl 1,3-diaminopropane. [In other words, for each molar equivalent of maleinized polymeric fatty acid, 0.5 mole methoxypolyethylene glycol and 0.5 mole N,N-dimethyl 1,3-diaminopropane is reacted.] In the equations, the maleinized polymeric fatty acid is represented by the formula R—(COOH).

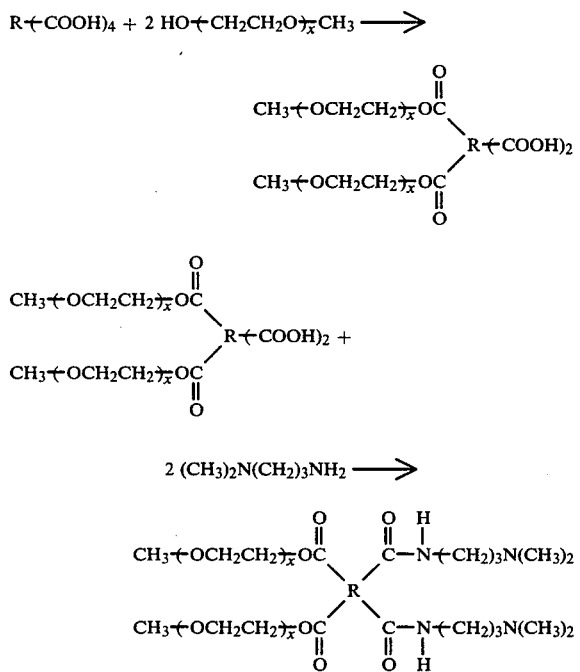

It will be recognized that the reaction becomes more complex where the poly(oxyalkylene)glycol and/or nitrogen-containing compound have more than one group capable of reacting with the carboxyl groups of the maleinized polymeric fatty acid. Where multifunctional reactants are involved, it will be appreciated by those skilled in the art that other reactions may occur in the reaction sequence. However, the by-products are not generally detrimental to the corrosion inhibiting properties of the compositions of this invention when the reactions are carried out in the prescribed manner.

Highly effective corrosion inhibitor compositions are obtained when the maleinized polymeric fatty acid, preferably maleinized $C_{36}$ dimeric fatty acid, is reacted with polyethylene glycol and the nitrogen-containing compound is a compound corresponding to formula I or II. This is particularly so when 0.33 to 0.67 mole polyethylene glycol and 0.67 to 0.33 mole nitrogen-containing compound are employed per molar equivalent of maleinized polymeric fatty acid. Especially useful corrosion inhibitors result when the nitrogen-containing compound is N-methyl diethanolamine, aminoethylethanolamine, N,N-dimethylethanolamine, 1,3-diaminopropane or N,N-dimethyl 1,3-diaminopropane.

As previously indicated, at least 50 percent of the total reacted carboxyl functionality of the maleinized polymeric fatty acid is reacted to obtain the useful products of this invention. The amount of carboxyl functionality reacted can be much higher, however, depending on the particular nitrogen-containing compound and reaction conditions employed. For example, when N-methyl diethanolamine, aminoethylethanolamine, 1,3-diaminopropane or N,N-dimethyl 1,3-diaminopropane are employed, 80 percent (and more usually 90 percent or more) of the total contained carboxyl functionality is typically reacted.

Reaction of the maleinized polymeric fatty acid with the poly(oxyalkylene)glycol and nitrogen-containing compound is carried out using conventional condensation procedures, that is, by heating the reaction mixture, with or without a catalyst, while removing water of reaction. The reaction with the poly(oxyalkylene)glycol is most generally carried out at a temperature of 175° C. to 250° C. whereas temperatures between about 120° C. and 200° C. are generally employed for reacting the nitrogen-containing compound. If the poly(oxyalkylene)glycol and nitrogen-containing compound are reacted in a single operation, a temperature from about 170° C. to about 210° C. will be used. The reactions are terminated when the calculated amount of water has been removed and/or the desired acid value has been reached.

While catalysts are not necessary for these reactions, conventional acid catalysts, such as alkyl and aryl sulfonic acids, sulfuric acid and phosphorous acid can be employed. Similarly, the reaction may be carried out in an inert organic diluent, preferably one which forms an azeotrope with water. This facilitates removal of the water of reaction. The reactions may be carried out under an inert atmosphere of nitrogen and, to facilitate removal of the final traces of water and drive the reaction to completion, a vacuum may be applied during the final stages of reaction.

If the reaction is carried out as a two-step operation, the reaction of the maleinized polymeric fatty acid and poly(oxyalkylene)glycol is generally continued until a predetermined acid value has been reached. At this point the temperature of the reaction mixture is lowered and the nitrogen-containing compound is charged to the reactor. The reaction sequence is then continued until the desired final acid value is obtained. The amino ester or amino ester-amide corrosion inhibitors thus produced may be used as such without further purification or work-up. The compositions are compatible with water at the prescribed use levels, i.e. generally up to about 5 weight percent, and aqueous solutions and dispersions thereof are readily prepared.

The following examples illustrate the invention more fully. Percentages are on a weight basis unless otherwise indicated. Acid values of the partial esters were determined using AOCS Method Te 1a-64 whereas acid values of the final amino ester or amino ester-amide products were determined by potentiometric titration using 0.1N KOH in 2-propanol. The electrode couple employed was a glass versus Ag/AgCl reference. Samples were dissolved in 2-propanol and the end-point was determined using the mid-point of the inflection curve (pH 10-11).

For the examples, corrosion inhibition is demonstrated by the use of a common test procedure wherein a metal coupon, after being coated with a hydrocarbon oil, is allowed to stand in a deaerated brine solution containing from 1 to 250 ppm of the corrosion inhibitor. Effectiveness of corrosion inhibition is determined by measuring the weight loss of the metal coupon.

For the test, the brine solution (5% sodium chloride solution in distilled water) is deaerated by bubbling nitrogen through the solution for at least three hours. Immediately prior to use, the solution is carbonated by bubbling $CO_2$ through the solution for approximately one-half hour. The prescribed amount of corrosion inhibitor is then added to the brine solution. About 450 mls of the brine solution is placed in the glass test cylinder and about 50 mls of a hydrocarbon solution (99% odorless kerosene/1% isopropyl alcohol) is then carefully poured over the surface of the brine solution—care being taken to avoid mixing the two solutions.

The metal test coupon (1/16"×1"×2" milled cold-rolled steel) is then lowered into the hydrocarbon layer. After holding the coupon in contact with the hydrocarbon solution for 10 seconds, the coupon is then lowered into the brine solution and left undisturbed for one week. Prior to use, the metal test coupon is cleaned with acetone, abraded with 240 grit emery paper and weighed to the nearest 0.01 mg.

After seven days, the coupon is removed from the flask, rinsed with acetone and dipped into solutions of 10 percent aqueous HCl and 10 percent aqueous NaOH. The surface of the coupon is then scrubbed with soapy water and a stiff short-bristled brush, rinsed with fresh water and acetone, dried and reweighed. Percent protection (corrosion inhibition) is then calculated in accordance with the equation:

$$\% \text{ Protection} = 100 \left[ 1 - \frac{T}{C} \right]$$

The control coupon is treated identically to the procedure described above except that a corrosion inhibitor is not added to the brine solution. Duplicate or triplicate tests are performed for corrosion inhibition and the percent protection value reported is the average. Percent protection values above about 50 percent are considered to be acceptable while values above 80 percent are considered to be superior.

EXAMPLE I

Preparation of Maleinized Polymeric Fatty Acid:

To a reactor equipped with a subsurface nitrogen inlet tube, thermometer with thermowatch and air/water condenser were charged 581.45 grams (1.8321 moles) polymeric fatty acid (acid value 193) and 134.73 grams (1.3740 moles) maleic anhydride. The reaction mixture was heated to 225°–235° C. with stirring while introducing nitrogen at a slow rate. Samples were periodically removed from the reactor to follow the reaction. After essentially all of the maleic anhydride was reacted (about 8 hours) a vacuum was gradually applied and increased to 5 mm Hg. After stripping for about 2 hours under reduced (5 mm Hg) pressure, the reaction mixture was cooled and filtered to obtain the maleinized fatty acid product having an acid value (anhydrous) of 215 and acid value (hydrous) of 257.

Reaction of Maleinized Polymeric Fatty Acid with Poly(oxyalkylene)Glycol and Nitrogen-Containing Compound:

A portion of the maleinized polymeric fatty acid (705.3 grams; 3.1207 molar equivalents) was combined with 832.2 grams (2.0804 moles) polyethylene glycol having an average molecular weight of 400 in a reactor equipped with a stirrer, subsurface nitrogen inlet, thermometer and water condenser fitted with a Dean-Stark trap. The reaction mixture (acid value 114) was heated to 210° C. under a nitrogen atmosphere with stirring while removing water of reaction. When approximately two-thirds of the available carboxyl functionality was reacted (acid value 40) heating was terminated and the reaction mixture allowed to cool. A portion of the resulting partial ester product (100 grams; 0.0713 molar equivalent) when then transferred to a similarly equipped but smaller reactor containing 8.5 grams (0.0713 mole) N-methyl diethanolamine and heated at 145° C. with stirring under nitrogen for about one and one-half hours. Heating was terminated when the product had an acid value of 4.5. The resulting product also had an amine value of 32.2, saponification value of 112 and 100° F. viscosity of 6300 centistokes. Analysis of the material showed the presence of products having molecular weights ranging from 1059 to 2166, however, the principal component in the product had a molecular weight of 1543. When the product was evaluated for corrosion inhibition in accordance with the test described above, 90 percent protection was obtained at 10 ppm.

EXAMPLE II

To demonstrate the ability to prepare the corrosion inhibitors in a single step, a reactor equipped with a stirrer, sub-surface nitrogen inlet, thermometer and condenser fitted with a Dean-Stark trap was charged with 121.9 grams (0.5392 molar equivalent) maleinized polymeric fatty acid (hydrous acid value 249). Polyethylene glycol (215.7 grams; 0.3595 mole) having an average molecular weight of 600 and 21.4 grams (0.1797 mole) N-methyl diethanolamine. The mixture was heated for about six hours with stirring under a nitrogen atmosphere until an amount of water corresponding to about 81 percent reaction of the carboxyl functionality was recovered. The resulting product (acid value 16) gave 87 percent protection when evaluated for corrosion inhibition at 10 ppm in accordance with the usual test procedure.

When the above experiment was repeated using the same molar ratio of reactants except that the polyethylene glycol had an average molecular weight of 400, similar results were obtained, i.e., the resulting corrosion inhibitor gave 84 percent protection when tested at the 10 ppm level.

EXAMPLE III

In accordance with the procedure of Example I, 904 grams (4.0 molar equivalents) maleinized polymeric fatty acid was reacted with 3.0 moles polyethylene glycol having an average molecular weight of 300. The esterification was carried out at a temperature of 185° C. After the theoretical amount of water was recovered (about four hours), the resulting partial ester product (acid value 29.8; equivalent weight 1883) was combined with N,N-dimethylaminopropylamine and the remaining carboxyl functionality reacted. For the reaction, 175 grams (0.10 mole) of the partial ester and 10.3 grams (0.10 mole) of the N,N-dimethylaminopropylamine were heated with 150 mls xylene to a maximum temperature of 135° C. After the theoretical amount of water was recovered (about one hour), xylene was removed under vacuum. The resulting ester-amide product (acid value 15, which corresponds to about 86 percent reaction of carboxyl functionality) was an effective corrosion inhibitor and gave 92 percent protection at 10 ppm.

EXAMPLES IV-X

A series of corrosion inhibitors were prepared by reacting various nitrogen-containing compounds with the partial ester prepared in accordance with Example I by reacting two-thirds of the carboxyl functionality of the maleinized polymeric fatty acid with a polyethylene glycol having an average molecular weight of 400. Reaction of the partial ester and nitrogen-containing compound was terminated when substantially all of the carboxyl functionality was reacted. The table below lists the nitrogen-containing compound reacted with the partial ester and the percent protection obtained therewith at 10 ppm.

| Example No. | | Percent Protection |
|---|---|---|
| IV | Aminoethylethanolamine | 88 |
| V | 1,3-Diaminopropane | 91 |
| VI | N,N—dimethylethanolamine | 88 |
| VII | N,N—dimethylaminopropylamine | 89 |
| VIII | Polyoxypropyleneamine (average MW 230) | 85 |
| IX | Polyoxypropyleneamine (average MW 400) | 86 |
| X | Polyglycoldiamine (average MW 163) | 87 |

EXAMPLES XI-XIII

To further demonstrate the ability to obtain useful corrosion inhibitors, a partial ester derived from maleinized polymeric fatty acid and polyethylene glycol having an average molecular weight of 600, prepared in accordance with the procedure described in Example I, was reacted with various amines. In each of the three reactions the amount of amine employed was sufficient to react with essentially all of the remaining carboxyl functionality of the partial ester. The final acid value of the corrosion inhibitor and the percent protection obtained at 10 ppm are listed below with the amine used.

| Example No. | | Acid Value | Percent Protection |
|---|---|---|---|
| XI | 1,3-Diaminopropane | 14 | 88 |
| XII | N—methyldiethanolamine | 5 | 84 |
| XIII | N,N—dimethylethanolamine | 28 | 84 |

EXAMPLES XIV-XXI

A series of corrosion inhibitors were prepared and evaluated. All of these products were prepared in a step-wise manner by first reacting the maleinized polymeric fatty acid (hydrous acid value 249) with a polyethylene glycol having an average molecular weight of 1000. An amount of nitrogen-containing compound sufficient to be reacted with all of the remaining functionality of the partial ester was then charged and the reaction continued. Details of these reactions as well as the percent protection obtained at 10 ppm for each of the products are set forth in Table I.

EXAMPLES XXII-XXXV

To demonstrate the ability to utilize high molecular weight poly(oxyalkylene)glycols and methoxy-capped poly(oxyalkylene)glycols, a series of partial esters were prepared by reacting the glycol and maleinized polymeric fatty acid. The resulting partial esters were then further reacted with various nitrogen-containing compounds to obtain useful corrosion inhibitors in accordance with the procedure of Example I. Details of these reactions are set forth in Table II.

TABLE I

| Example No. | Moles Glycol Per COOH Equivalents | Acid Value Of Partial Ester | Nitrogen-Containing Compound | Percent Protection |
|---|---|---|---|---|
| XIV | 0.25 | 87.1 | N,N—dimethylethanolamine | 80 |
| XV | 0.50 | 41.9 | Aminoethylethanolamine | 84 |
| XVI | 0.50 | 41.9 | Polyoxypropyleneamine (Average MW 230) | 84 |
| XVII | 0.50 | 41.9 | Polyoxypropyleneamine (Average MW 400) | 79 |
| XVIII | 0.50 | 41.9 | 1,3-Diaminopropane | 86 |
| XIX | 0.50 | 43.3 | N—methylethanolamine | 77 |
| XX | 0.50 | 43.3 | N,N—dimethylaminopropylamine | 81 |
| XXI | 0.66 | 24.3 | 1,3-Diaminopropane | 74 |

TABLE II

| Example No. | Poly(oxyalkylene) Glycol | Moles Glycol Per COOH Equivalents | Acid Value Of Partial Ester | Nitrogen-Containing Compound |
|---|---|---|---|---|
| XXII | Polyethylene glycol (Average MW 1540) | 0.50 | 31.0 | Aminoethylethanolamine |
| XXIII | Polyethylene glycol (Average MW 1540) | 0.50 | 31.0 | N,N—dimethylaminopropylamine |
| XXIV | Polyethylene glycol (Average MW 1540) | 0.67 | 19 | Aminoethylethanolamine |
| XXV | Polyethylene glycol (Average MW 3350) | 0.50 | 13.6 | Aminoethylethanolamine |
| XXVI | Polyethylene glycol (Average MW 3350) | 0.50 | 13.6 | N—methyldiethanolamine |
| XXVII | Polyethylene glycol (Average MW 3350) | 0.50 | 13.6 | Polyoxypropyleneamine (Average MW 400) |

TABLE II-continued

| Example No. | Poly(oxyalkylene) Glycol | Moles Glycol Per COOH Equivalents | Acid Value Of Partial Ester | Nitrogen-Containing Compound |
|---|---|---|---|---|
| XXVIII | Polyethylene glycol (Average MW 3350) | 0.50 | 13.6 | Polyoxypropyleneamine (Average MW 230) |
| XXIX | Polyethylene glycol (Average MW 3350) | 0.50 | 13.6 | N,N—dimethylethanolamine |
| XXX | Polyethylene glycol (Average MW 8000) | 0.67 | 3.5 | Aminoethylethanolamine |
| XXXI | Polyethylene glycol (Average MW 8000) | 0.67 | 3.5 | N—methyldiethanolamine |
| XXXII | Methoxypolyethylene glycol (Average MW 550) | 0.67 | 34.3 | 1,3-Diaminopropane |
| XXXIII | Methoxypolyethylene glycol (Average MW 550) | 0.67 | 34.3 | N—methyldiethanolamine |
| XXXIV | Methoxypolyethylene glycol (Average MW 550) | 0.67 | 34.3 | N,N—dimethylethanolamine |
| XXXV | Methoxypolyethylene glycol (Average MW 750) | 0.50 | 48.6 | N,N—dimethylethanolamine |

All of the compounds listed in Table II were effective corrosion inhibitors. For example, percent protection values obtained at 10 ppm with the products of Examples XXXII through XXXV, were 91, 88, 85 and 77, respectively. Higher concentrations of the corrosion inhibitor were, however, generally required to achieve acceptable levels of corrosion protection with products prepared using higher molecular weight polyethylene glycols. For example, while the product of Example XXII gave 55 percent protection at 10 ppm, significantly higher corrosion inhibition was obtained when the concentration was increased. Similarly, the products of Examples XXVI and XXIX respectively gave 62 and 64 percent protection at 100 ppm, but by raising the concentration to 250 ppm the respective percent protection values were increased to 85 and 84 percent.

EXAMPLE XXXVI

To further demonstrate the versatility of the compositions of this invention, a maleinized polymeric fatty acid obtained by reacting Empol ®1024 Dimer Acid and maleic anhydride at a molar ratio of 1.0:0.4 was employed for the preparation of a corrosion inhibitor in accordance with the procedure of Example I. The maleinized polymeric fatty acid (185.1 grams; 0.7364 molar equivalent) which had an acid value of 223.2 and saponification value of 230.4 was combined with 220.9 grams (0.3682 mole) polyethylene glycol having an average molecular weight of 600 and reacted to an acid value of 52.92. The resulting partial ester was then combined with an amount of N,N-dimethylethanolamine sufficient to react with the remaining carboxyl functionality of the partial ester and reacted. When an acid value of 35 was achieved the reaction was terminated and the corrosion inhibitor composition recovered. The resulting mixed amino ester product was evaluated for corrosion inhibition and provided 77 percent protection at 10 ppm.

The above experiment was repeated utilizing a maleinized polymeric fatty acid (acid value 238.2; saponification value 244.5) obtained by reacting Empol ®1024 Dimer Acid and maleic anhydride at a molar ratio of 1.0:0.6. The resulting partial ester in this instance had an acid value of 53.2 and, after reaction with the N,N-dimethylethanolamine, the final product had an acid value of 42. Eighty-seven percent protection was obtained with this corrosion inhibitor at 10 ppm.

We claim:

1. A water-soluble or water-dispersible corrosion inhibitor composition obtained by reacting (a) a maleinized polymeric fatty acid,
(b) a poly(oxyalkylene)glycol having an average molecular weight from about 200 to 8000 or alkoxypoly(oxyalkylene)glycol having an average molecular weight from 200 to 2000, wherein the recurring oxyalkylene groups contain 2 or 3 carbon atoms, and
(c) a nitrogen containing compound selected from the group consisting of

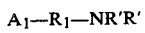

$$A_1-R_1-NR'R'$$

wherein $R_1$ is a bivalent hydrocarbon radical having from 2 to 6 carbon atoms, $R'$ is hydrogen or a $C_{1-4}$ alkyl group, and $A_1$ is —OH, —NH$_2$ or —NHR' wherein R' is the same as defined above;

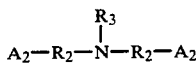

$$A_2-R_2-\underset{\underset{R_3}{|}}{N}-R_2-A_2$$

wherein $R_2$ is a bivalent hydrocarbon radical having from 2 to 4 carbon atoms, $R_3$ is hydrogen, $C_{1-4}$ alkyl, —R$_2$OH or —R$_2$NH$_2$ wherein $R_2$ is the same as defined above and $A_2$ is —OH or —NH$_2$; and

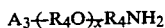

$$A_3(-R_4O)_xR_4NH_2$$

wherein $R_4$ is —CH$_2$CH$_2$—, —CH$_2$CH$_2$CH$_2$—, or

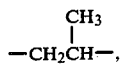

$$-CH_2\underset{\underset{CH_3}{|}}{CH}-,$$

x is an integer from 1 up to about 40 and $A_3$ is —OH, —NH$_2$ or an alkoxy radical having from 1 to 12 carbon atoms;

at least 50 percent of the total available carboxyl groups of said maleinized polymeric fatty acid being reacted.

2. The corrosion inhibitor composition of claim 1 wherein 0.25 to 0.75 mole (b) is employed per molar equivalent of (a) and for each molar equivalent (a) the number of moles of (c) is 1-x, where x is the number of moles of (b).

3. The corrosion inhibitor composition of claim 2 wherein the maleinized polymeric fatty acid is derived from a polymeric fatty acid containing 75 percent or more C$_{36}$ dimer acid.

4. The corrosion inhibitor composition of claim 3 wherein the reaction is conducted in a step-wise manner whereby (a) and (b) are reacted at a temperature of 175° C. to 250° C. to obtain a partial ester which in turn is reacted with (c) at a temperature between 120° C. and 200° C.

5. The corrosion inhibitor composition of claim 3 wherein (a), (b) and (c) are reacted as a unit operation at a temperature from about 170° C. to 210° C.

6. The corrosion inhibitor composition of claims 4 or 5 wherein (b) is a polyethylene glycol having an average molecular weight from about 300 to 4000 or methoxypolyethylene glycol having an average molecular weight from about 300 to 1000.

7. The corrosion inhibitor composition of claim 6 wherein (c) is selected from the group consisting of N-methyl diethanolamine, aminoethylethanolamine, N,N-dimethylethanolamine, 1,3-diaminopropane or N,N-dimethyl 1,3-diaminopropane.

8. The corrosion inhibitor composition of claim 7 wherein 0.33 to 0.67 mole (b) is reacted per molar equivalent of (a).

9. The corrosion inhibitor composition of claim 8 wherein 80 percent or more of the total available carboxyl functionality of (a) is reacted.

10. A method of preventing corrosion of metals which come into contact with water or a water-containing hydrocarbon which comprises incorporating into said water or water-containing hydrocarbon mixture from 1 up to about 250 ppm of a corrosion inhibitor composition obtained by reacting (a) a maleinized polymeric fatty acid, (b) a poly(oxyalkylene)glycol having an average molecular weight from about 200 to 8000 or alkoxypoly(oxyalkylene)glycol having an average molecular weight from 200 to 2000, wherein the recurring oxyalkylene groups contain 2 or 3 carbon atoms, and (c) a nitrogen containing compound selected from the group consisting of

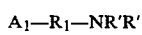

wherein $R_1$ is a bivalent hydrocarbon radical having from 2 to 6 carbon atoms, R' is hydrogen or a $C_{1-4}$ alkyl group, and $A_1$ is —OH, —NH$_2$ or —NHR' wherein R' is the same as defined above;

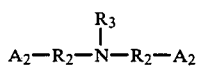

wherein $R_2$ is a bivalent hydrocarbon radical having from 2 to 4 carbon atoms, $R_3$ is hydrogen, $C_{1-4}$ alkyl, —R$_2$OH or —R$_2$NH$_2$ wherein $R_2$ is the same as defined above and $A_2$ is —OH or —NH$_2$; and

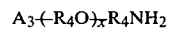

wherein $R_4$ is —CH$_2$CH$_2$—, —CH$_2$CH$_2$CH$_2$—, or

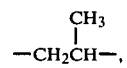

x is an integer from 1 up to about 40 and $A_3$ is —OH, —NH$_2$ or an alkoxy radical having from 1 to 12 carbon atoms;

at least 50 percent of the total available carboxyl groups of said maleinized polymeric fatty acid being reacted.

11. An aqueous corrosion inhibiting composition containing a corrosion inhibiting amount up to 5 weight percent of a composition obtained by reacting (a) a maleinized polymeric fatty acid, (b) a poly(oxyalkylene)glycol having an average molecular weight from about 200 to 8000 or alkoxypoly(oxyalkylene)glycol having an average molecular weight from 200 to 2000, wherein the recurring oxyalkylene groups contain 2 or 3 carbon atoms, and (c) a nitrogen containing compound selected from the group consisting of

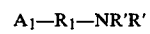

wherein $R_1$ is a bivalent hydrocarbon radical having from 2 to 6 carbon atoms, R' is hydrogen or a $C_{1-4}$ alkyl group, and $A_1$ is —OH, —NH$_2$ or —NHR' wherein R' is the same as defined above;

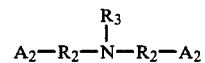

wherein $R_2$ is a bivalent hydrocarbon radical having from 2 to 4 carbon atoms, $R_3$ is hydrogen, $C_{1-4}$ alkyl, —R$_2$OH or —R$_2$NH$_2$ wherein $R_2$ is the same as defined above and $A_2$ is —OH or —NH$_2$; and

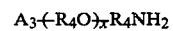

wherein $R_4$ is —CH$_2$CH$_2$—, —CH$_2$CH$_2$CH$_2$—, or

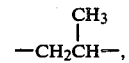

x is an integer from 1 up to about 40 and $A_3$ is —OH, —NH$_2$ or an alkoxy radical having from 1 to 12 carbon atoms;

at least 50 percent of the total available carboxyl groups of said maleinized polymeric fatty acid being reacted.

* * * * *

UNITED STATES PATENT AND TRADEMARK OFFICE
CERTIFICATE OF CORRECTION

PATENT NO. : 4,560,497
DATED : December 24, 1985
INVENTOR(S) : D. D. Staker and W. S. Kain It is certified that error appears in the above-identified patent and that said Letters Patent are hereby corrected as shown below:

Column 1, line 27, "to" should read --- in ---; line 34, "everincreasing" should read --- ever-increasing ---.

Column 5, line 16, "(COOH)" should read --- $(COOH)_4$ ---.

Column 7, line 38, --- T = average weight loss of the test coupon, C = average weight loss of a control coupon --- should be inserted after the equation.

Column 10, line 11 of Table I, "N—methylethanolamine" should read --- N—methyldiethanolamine ---.

Signed and Sealed this

Eighth Day of April 1986

[SEAL]

Attest:

DONALD J. QUIGG

Attesting Officer

Commissioner of Patents and Trademarks